No. 856,291. PATENTED JUNE 11, 1907.
J. A. PERKINS.
ROLLER BEARING.
APPLICATION FILED AUG. 5, 1903.
3 SHEETS—SHEET 1.
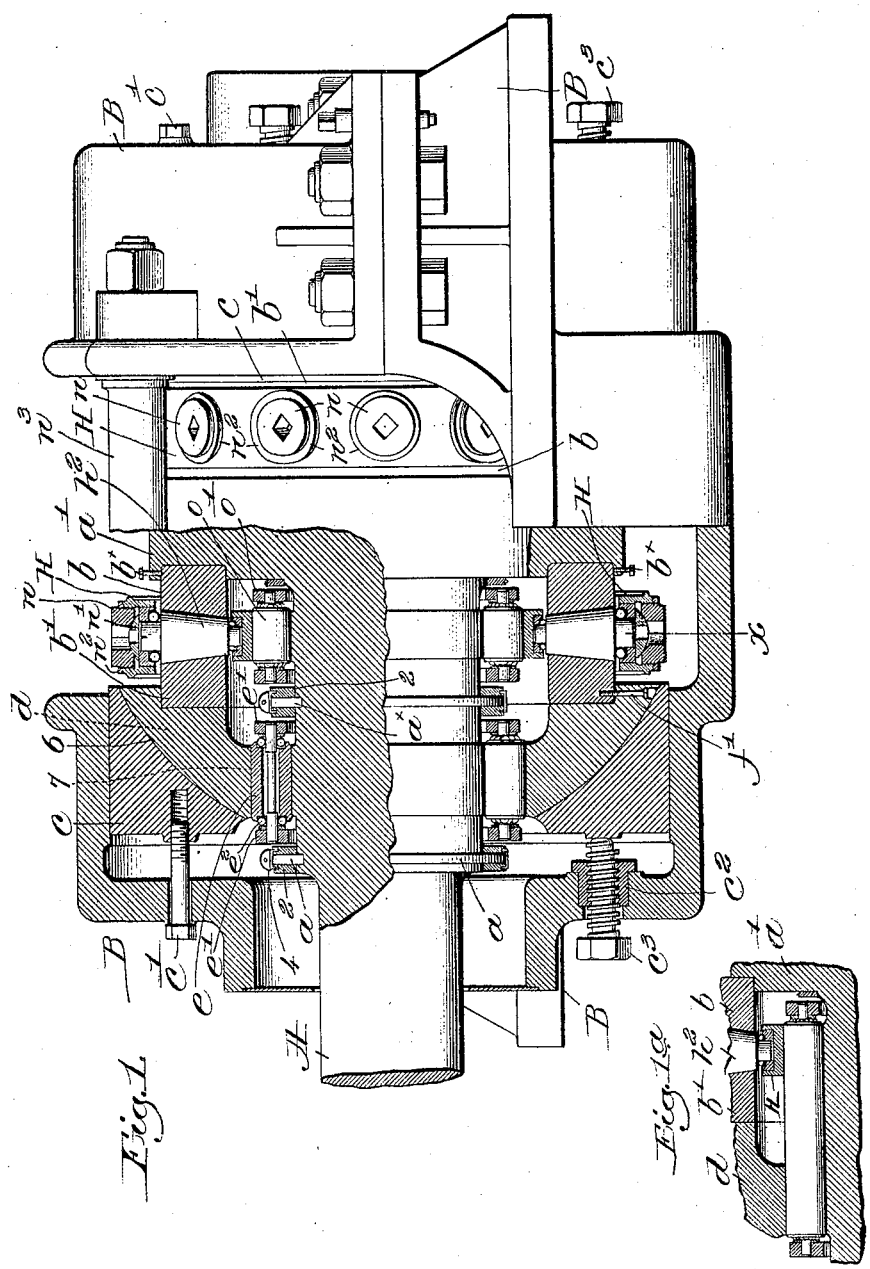

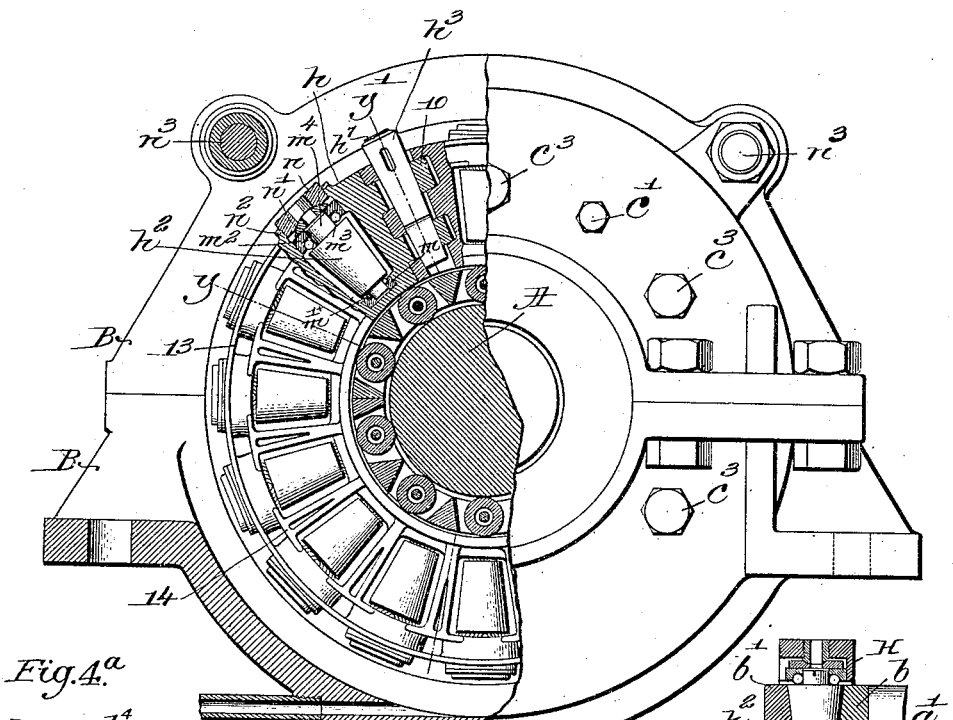

No. 856,291. PATENTED JUNE 11, 1907.
J. A. PERKINS.
ROLLER BEARING.
APPLICATION FILED AUG. 5, 1903.
3 SHEETS—SHEET 3.
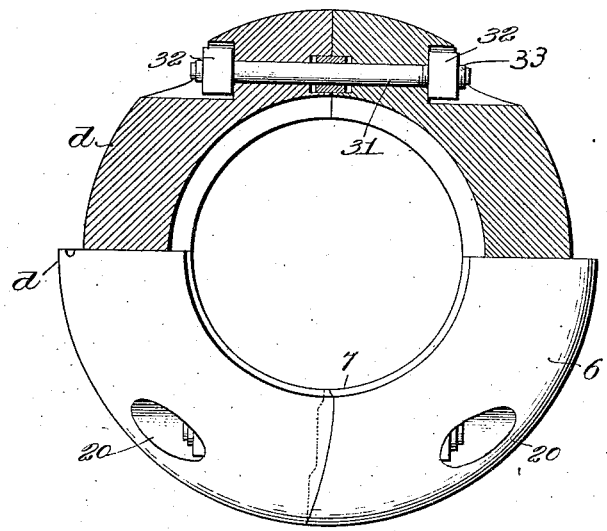
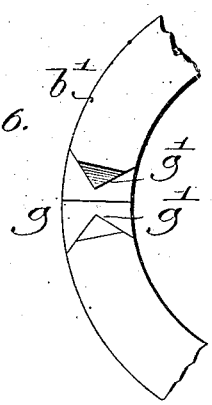
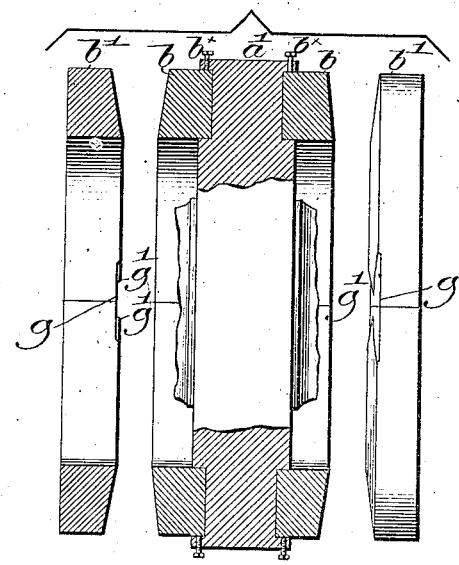
Witnesses:
Fred S. Greenleaf
S. Wm. Lutton
Inventor.
Julius A. Perkins,
by Crosby & Gregory
Attys.

UNITED STATES PATENT OFFICE.

JULIUS A. PERKINS, OF OMAHA, NEBRASKA, ASSIGNOR, BY MESNE ASSIGNMENTS, TO UNITED STATES ROLLER BEARING COMPANY, OF JERSEY CITY, NEW JERSEY, A CORPORATION OF NEW JERSEY.

ROLLER-BEARING.

No. 856,291.      Specification of Letters Patent.      Patented June 11, 1907.

Application filed August 5, 1903. Serial No. 168,261.

*To all whom it may concern:*

Be it known that I, JULIUS A. PERKINS, a citizen of the United States, residing at Omaha, in the county of Douglas and State of Nebraska, have invented an Improvement in Roller-Bearings, of which the following description, in connection with the accompanying drawings, is a specification, like letters on the drawings representing like parts.

This invention has for its object to improve that class of bearing represented in United States Patent No. 673,220, dated April 30, 1901.

One feature among others of improvement to be herein described consists in providing a ring-shaped track-piece having two faces against one of which rolls the cylindrical bearing-rollers and the other the conical end-thrust-rollers.

Each ring-shaped double-faced track-piece has a convexed back that is sustained in a concaved seat in the face of an adjustable backing-ring.

The cage for holding the conical end-thrust rollers is also of novel construction, the aim being to secure the greatest strength with the least weight of metal, the cage being so constructed as to enable each end-thrust roller to be applied to and removed from the cage independently of the others, and this without removing the cage from the shaft.

The zones of the cage are shown as having their ends united by tapering-keys occupying a position radial to the shaft, said keys passing through preferably a plurality of interlocking projections. The cage shown is beveled from its periphery inwardly toward its center, the bevel corresponding substantially with the bevel of the tracks to be described and of the conical-rollers.

The inner end of each roller-space is shaped to receive and sustain a ball-track, the journal at the small end of said conical roller entering the space between the balls in the track while the ends of the rollers contact with said balls.

The opposite ends of the conical-rollers exactly at right angles to the longitudinal axis thereof are acted upon by balls in other suitable ball-tracks applied to each cage, said ball-tracks having a loose fit at their periphery in the cage. These ball-tracks are acted upon through hollow-bolts screwed into the cages to close the bores made therein for the reception of the conical rollers, the inner ends of these bolts being so shaped as to coact with the ball-tracks to permit the latter as they are forced inwardly to assume a position exactly parallel with the shoulders at the outer ends of the bearing-rollers.

For the production of a practically indestructible bearing it has been found essential that the ball-tracks containing the balls at the outer ends of the conical-rollers be parallel with the shoulders sustaining the balls at the outer ends of said rollers, otherwise the pressure on the balls will vary, and if out of parallelism to any considerable extent, one ball might receive substantially all the end-thrust, and in such case it might be broken, and hence the great desirability of provision for maintaining exact parallelism between the shoulder and track surfaces.

It will be noticed that the means for insuring the parallelism of the track and shoulder include a concave and a convex surface, to be described.

Figure 1 in side elevation shows a casing and roller-bearing parts embodying my present invention, one half of the casing being shown in elevation, the other being broken away and showing in section one half of the interior parts of the roller-bearing; Fig. 1ª shows a modification of the invention; Fig. 2 is an end view of the bearing with the casing similarly divided to show part of one of the end-thrust cages and its series of conical bearing-rollers, the cage being shown partly in section, the section being in the line *x*, Fig. 1; Fig. 3 is a partial section in the line *y*, Fig. 2; Fig. 3ª is a partial section in the line *x*², Fig. 2; Fig. 4 is a partial section in the line *y'*, Fig. 2; Figs. 4ª and 4ᵇ, in two views, show a modified form of device for uniting the cages sustaining the end-thrust rollers; Fig. 5 is a sectional detail and elevation looking at the convexed side of the track-piece; Fig. 6 a detail showing part of a track and the relief therein; Fig. 7 a detail showing part of the shaft with its collar and two tracks at opposite sides thereof, the outermost tracks having the relief, one of said outermost tracks being represented in section and the other in elevation, and Fig. 8 is a detail showing a modification of my invention.

The casing B separable in any usual manner and surrounding the shaft A, is sustained immovably against motion with relation to the ship.

The shaft A has a rigid or fixed collar $a'$, and at each side said collar, is shown as surrounded by two controllers $a$, $a^\times$ fixed thereon in any usual or suitable manner.

The controllers $a$ and $a^\times$ have at their sides anti-friction washers 2, each peripherally grooved to receive part of a band 4 that embraces the controllers, see Fig. 1, thus confining the washers in working position.

At each side of the collar $a'$ an annular groove has been cut in which is inserted a track $b$. Screws $b^\times$ extend through a flange left by forming said grooves, engage the outer portion of the track and aid in retaining the same against lateral movement with relation to the collar.

The casing B is cut away centrally at its upper side to expose the movable parts of the bearing that they may be easily accessible for inspection or removal.

The ends of the casing receive first the backing-rings $c$, the peripheries of which fit the interior of the casing. Each of these backing-rings has a plurality of threaded holes which receive a series of adjusting means shown as screw-bolts $c'$, the shanks of said bolts turning freely in holes in the ends of the casing. Each end of the casing, see Fig. 1, is also provided with a nut $c^2$ that receives a screw $c^3$ the end of which abuts the rear side of the backing-ring. By turning the screw-bolts and screws in one or the other direction the backing-ring may be adjusted longitudinally of the shaft and be made to occupy any desired position, this adjustment affording opportunity to provide against any inaccuracies of workmanship or slight variations in measurement, and to permit the parts to be assembled with the greatest accuracy which is necessary to enable two or more end-thrust bearings surrounding one shaft to work equally, each set taking its due proportion of pressure. So also by adjusting the backing-ring sustaining the ring-shaped tracks, an amount of end-play for the shaft in its bearings may be provided for to enable one set of the conical bearing-rollers to remain at rest, as for instance while backing the ship, while the other set then resisting the thrust of the shaft continues to revolve, it being understood that the set of conical end-thrust rollers leading in the direction of movement of the vessel are the ones that revolve, while the end-thrust rollers at the opposite side of the collar on the shaft are the ones that are relieved of the end-thrust of the shaft and consequently can remain substantially at rest.

The inner face of each backing-ring, one in each end of the casing, is concave to form a seat for the convex side of one of the double-faced track pieces $d$, the face 7 of said back-piece contacting with the bearing rollers $e$ revolving about the spindle of cage $e'$, balls $e^2$ being interposed between the spindles and rollers, as provided for in said patent. The convex face 6 forms part of a sphere, the center of which coincides with the point of intersection of a line drawn through the longitudinal center of the shaft, with a line drawn at right angles to said shaft through the center of the enlarged collar thereon, said point being the center of the bearing. Sustaining the convex outer side or back of the track piece $d$ in the concave seat of the backing ring enables the shaft and the bearing rollers surrounding the same at opposite sides of the fixed collar of the shaft to oscillate or tip slightly with the shaft as a whole in or with relation to the casing, should necessity require, without at all disturbing the relative positions of the parts of the bearing or changing or varying the pressure of the conical end-thrust roller on the ring-shaped track-pieces.

Each track-piece, sustains a track $b'$ complemental to the track $b$. The track $b'$ is held in position in the track-piece by means of suitable screws $f'$ one of which is shown in Fig. 1. These tracks $b$, $b'$, as well as the track-pieces and backing-pieces, are made of a plurality of segmental parts that they may be readily applied to or removed from the shaft without disturbing the latter.

To insure against deterioration of the bearing, due to any imperfections in the tracks over which the surfaces of the conical rollers travel in their planetary motion about the shaft, which inaccuracies would tend to exert unequal strain on the rollers and their journals and thus exert a tendency to destroy the efficiency of the roller bearings, I have provided the tracks as shown at the meeting ends of each track segment with a space $g$ or a relief, see Figs. 6 and 7, about one-sixteenth of an inch deep, and about one inch wide between the points $g'$ of said space. The points $g'$ are shown as beveled and the space $g$ is gradually widened toward the inner and outer ends of the tracks toward the points of the tracks $g'$. This point in the track constitutes a relief for the conical end-thrust rollers, and on arriving opposite said spaces, enter therein, are relieved from pressure and immediately right themselves, in case of necessity, and assume true radial positions with relation to the shaft, and on leaving the spaces, the rollers ride up the inclination onto the track and gradually receive the pressure from a point substantially midway of their length to their ends.

The cages H composed of a plurality of parts $h$, $h'$, and carrying the conical-bearing rollers $h^2$, have at their ends interlocking projections, each part as shown in Figs. 2 and 4 having at one end two projections 10 and at the other end three projections, said projections interlocking as shown in Fig. 2. Each projection is provided with a key-slot, and the slots in the interlocking projections when in line are locked by tapering-keys $h^3$, the movement of which radially with relation to the cage secures the ends of the two parts of the cage firmly together. These keys see Figs. 2 and 4 may be forced or driven inwardly and be held in their operative positions as indicated at the upper side of Fig. 2 and Fig. 4, or be held in any suitable manner.

Figs. $4^a$ and $4^b$ show a modification where the wedge-shaped key is provided with a screw $h^4$ loosely extended therethrough and threaded at its inner end to enter the cage. When a screw $h^4$ is used to adjust the key the accidental rotation of the screw may be prevented by applying to the outer end of the key plates $h^5$, one side of which contacts with one of the many faces of the head of the screw. When the key is driven in it may be held in place by means of a strap $h^7$ crossing the key and confined to the exterior of the cage by means of screws $h^8$.

The interlocking projections at the ends of the cage will preferably be round, as shown Figs. 2 and 4, to enter round holes in the opposed cage ends, but they may have flat faces as shown in Figs. 4 and $4^a$.

The side faces of the cage are beveled, that being substantially the same as the bevel of the tracks $b$ and $b'$, or the taper of the bearing-rollers $h^2$.

Each cage will preferably be strengthened by flanges 13, 14, the flanges 13 extending completely about the cage at its periphery, while the flanges 14 are interrupted and appear only between the roller-spaces of the cage.

Each cage has a series of peripheral openings $m$ threaded at their interior, and a series of spaces through the sides of which are exposed the conical end-thrust-rollers that contact with the tracks $b$, $b'$. The inner portion of the cage has a series of depressions in which are located ball-cages $m'$ containing balls $m'^x$ that contact with shoulders at the smaller ends of the rollers.

The openings at the outer edge of the cage receive ball-tracks $m^2$ in which are introduced balls $m^3$, the journals $m^4$ at the upper ends of the conical-rollers entering said ball-tracks and contacting with the balls therein, while the shoulders $m^5$ at the larger ends of said rollers and contacting with said balls form a ball-track complemental to the track $m^2$.

The threaded openings at the periphery of the cage, after the conical-rollers, ball-tracks and balls have been inserted, receive open-centered screws $n$ and rockers $n'$.

To insure that each ball shall sustain its proper proportion of end-thrust, it is essential that the inner face of the ball-track $m^2$ and the shoulder $m^5$ of the end-thrust roller $h^2$ between which are located the balls $m^3$ be exactly parallel, otherwise one ball might receive all the end-thrust and be broken. As one means for insuring this parallelism of the ball-track and shoulder of the roller, the hollow-screw $n$ and a rocker $n'$ that contacts with the outer side of the ball-race are employed, the provision of a convex and a concave-surface as shown between the screw and the ball-race enabling the face of each ball-race to be adjusted to occupy a position exactly parallel with each shoulder at the outer end of each conical-roller.

In Fig. 3 the inner end of the screw is shown as concaved, and the interposed rocker $n'$ as convexed, but it is obvious that this construction might be just the converse as represented in Fig. 8, wherein the hollow screw is convexed and enters a concavity in the rocker.

When a bearing is assembled it is very desirable to know that all the conical rollers are so held as to be turned with the application of substantially the same amount of force, and to test each roller as to this feature a tool may be inserted through the hollow-screw into a nick or space in the outer journal $m^4$ of the roller, and said roller turned and tested, this being done preferably when the shaft is under slight end-thrust pressure.

In the drawing Fig. 1 the interior of the cages containing the conical end-thrust rollers receive within them a series of cylindrical bearing rollers $o$ sustained on balls contacting with spindles and the end walls of a floating-cage $o'$ which has anti-friction washers at each side thereof. These cylindrical-rollers $o$ are effective to sustain the cage carrying the conical end-thrust rollers in its relation to the shaft whenever, for instance, the conical-rollers of that cage are relieved from pressure as by the movement of a vessel in one or the other direction, being maintained in its normal position, the end-thrust cage is always ready to again receive instantly the pressure of the tracks whenever the end-thrust rollers are to receive the end-thrust. Instead of these cylindrical bearing-rollers, however, the shaft may be loosely surrounded with a ring $p$, see Fig. 8, the external diameter of which is such as to fit loosely the inner diameter of the cage H sustaining the end-thrust rollers.

When ring $p$ is used it serves the purpose of a cage controller, and enables the intermediate cage controller $a^x$, shown in Fig. 1, to be omitted. Preferably the ring $p$ will have a series of oil holes that a lubricant may be used between the shaft, the ring, and the cage.

Each ring-shaped track, d, composed of two pieces, as best shown in Fig. 5, is provided with holes 20 through which are inserted bolts 31 on the ends of which are applied nuts 32 having holes 33 at their faces that may be engaged by pins of a wrench or spanner to thus turn the nuts. The upper part of the casing when broken out to expose the cages H and collar, may be stiffened and strengthened by tie rods $n^3$. The casing sustaining the shaft and its bearing may contain oil in which the parts may run.

In the modification, Fig. 1$^a$, I have shown one cage in which the bearing-rollers are of a length not only to sustain the ring-shaped track d, but also the interior of the cage H carrying the end-thrust rollers. This one cage and its roller may be substituted for the two cages having shorter cylindrical rollers, shown in Fig. 1.

Having described my invention, what I claim and desire to secure by Letters Patent is:—

1. In a roller-bearing, a shaft having a collar presenting at one side a track, two cages surrounding said shaft at one side said collar, one of said cages containing a series of bearing-rollers and the other a series of conical end-thrust-rollers, and a tipping ring-shaped-track over which travel both said bearing-rollers and said end-thrust-rollers.

2. In a roller-bearing, a rigid casing, a shaft having a collar presenting at one side a track, two cages surrounding said shaft at one side said collar, one of said cages containing a series of bearing-rollers and the other a series of conical end-thrust-rollers, and a double-faced ring-shaped track over which both said sets of rollers travel, said track being movable in a curve intersecting the longitudinal axis of said bearing rollers, because of any displacement of the longitudinal axis of said shaft.

3. In a roller bearing, a set of bearing rollers, a set of end thrust rollers, a shaft having a fixed collar, a casing surrounding said shaft and having a convex seat, and a double-faced ring shaped track presenting a convexed back entering said seat loosely, said track being acted upon by both said bearing rollers and said end thrust rollers, said tracks being free to turn in said seat with said rollers to accommodate for any displacement of the longitudinal axis of the shaft.

4. In a roller bearing, a shaft provided with a collar, a rigid, separable casing, a detachable backing ring therein having a concaved seat, a ring shaped track having a convexed side seated in the concavity of said backing ring, means to adjust said backing ring in said casing and with it said ring shaped track longitudinally of said shaft, and rollers interposed between said ring shaped track and the collar on the shaft, said ring-shaped track and rollers being movable together to accommodate for any displacement of the longitudinal axis of the shaft.

5. In a roller bearing, a shaft provided with a collar, a casing, a detachable backing ring having a seat, means for adjusting longitudinally of the shaft and maintaining said backing ring in its adjusted position, a ring shaped-track seated in said backing ring, and roller cages having sets of rollers interposed directly between said ring-shaped track and the periphery of said shaft, and between said track and the side of the collar.

6. In a roller-bearing, a shaft having a collar provided at its sides with an annular groove presenting an external flange, a track composed of a plurality of parts inserted in said groove, and means to secure said track in said groove against movement in the direction of the length of said shaft, said flange preventing movement of said track parts at right angles to said shaft.

7. In a roller-bearing, a shaft having a collar, two tracks at one side of said collar, one track having a relief represented by a space and beveled points entering the space, and a cage having conical end-thrust-rollers interposed between said tracks.

8. In a roller bearing, a shaft having a collar, two tracks at one side of said collar, one track having a relief presenting two points and a space, the latter being gradually widened toward the inner and outer edges of the track from said point.

9. In a roller bearing, a cage having a series of spaces, end thrust rollers mounted in said spaces and having ball sustaining shoulders at right angles to the longitudinal axis of said rollers, loose ball tracks and balls to travel over said shoulders and contact with the journals of said rollers, and means to insure parallelism between the inner face of the outermost ball track and the shoulder at the outer end of said end thrust roller.

10. In a roller bearing, an end thrust cage having a series of spaces, end thrust conical rollers mounted in said spaces and having ball sustaining shoulders at right angles to the longitudinal axis of said rollers, loosely sustained ball tracks and balls therein contacting with the shoulders and journals of said rollers, a screw, and a device interposed between said screw and the outer side of said ball track, said screw and device presenting one a convex, and the other a concave, surface to operate substantially as described.

11. In a roller bearing, a cage having a series of spaces, end thrust rollers mounted in said spaces and having shoulders at right angles to the longitudinal axis of said rollers, the journals of said rollers projecting beyond said shoulders, but being maintained within the preiphery of said cage, loosely sustained ball tracks and balls therein contacting with the shoulder of said rollers, a hollow screw, and a hollow device, both carried by said cage, the hollow device being interposed between the inner end of said hollow screw and the outer side of said ball track, said screw and device presenting one a convex and the other a concave surface, said device being automatically movable to insure parallelism between the face of the outermost ball track and the shoulder at the outer end of said end thrust roller, the openings in the nut and said device permitting the journal of the roller to be engaged when it is desired to turn the roller without turning the cage.

12. In a roller bearing, a cage having roller spaces, a series of conical end thrust rollers located in said spaces, and having shoulders at right angles to the longitudinal axis of said rollers, loosely sustained ball tracks, and balls interposed between said tracks and the journals of said rollers, and a series of screws, said screws being hollow to receive a device by which to engage and turn the rollers.

13. In a roller-bearing, a cage composed of a plurality of segments having roller-receiving-spaces, each segment having at its ends interlocking projections, and radial wedge shaped keys entering spaces in said projections and confining the cage segments rigidly together.

14. In a roller-bearing, a cage composed of a plurality of segments having roller-receiving-spaces, each segment having at its ends interlocking projections, and radial wedge shaped keys entering spaces in said projections and confining the cage segments rigidly together, and means to secure said keys in their operative position.

15. In a roller-bearing, a shaft having a collar presenting at one side a track, two cages surrounding said shaft at one side said collar, a series of bearing rollers in one of said cages and a series of conical end-thrust rollers in the other of said cages, and a tipping ring-shaped-track interposed between said bearing-rollers and said end-thrust-rollers, and a series of bearing-rollers interposed between the shaft and the interior of the cage carrying the end-thrust-rollers.

16. In a roller bearing, a cage composed of segments having at each end a plurality of projections provided with holes, the holes in all the projections when interlocked occupying a position in line one with the other, and a radial key inserted in all the holes of all the projections.

17. In a roller bearing, a cage composed of segments having at each end a plurality of projections provided with holes, the holes in all the projections when interlocked occupying a position in line one with the other, and a radial key inserted in all the holes of all the projections, and means to lock the key in its operative position.

In testimony whereof, I have signed my name to this specification, in the presence of two subscribing witnesses.

JULIUS A. PERKINS.

Witnesses:
   GEO. W. GREGORY,
   LOUISE ROTHSTEIN.